United States Patent
Diedrichsen et al.

(10) Patent No.: US 6,671,716 B1
(45) Date of Patent: Dec. 30, 2003

(54) PROCESSING EXTENDED TRANSACTIONS IN A CLIENT-SERVER SYSTEM

(75) Inventors: Jens Diedrichsen, Winchester (GB); Susan Patricia Paice, Eastleigh (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/554,779

(22) PCT Filed: Nov. 28, 1997

(86) PCT No.: PCT/GB97/03292

§ 371 (c)(1),
(2), (4) Date: May 18, 2000

(87) PCT Pub. No.: WO99/28842

PCT Pub. Date: Jun. 10, 1999

(51) Int. Cl.[7] .............................................. G06F 17/60
(52) U.S. Cl. ......................................... 709/203; 705/26
(58) Field of Search ................................ 709/203, 217; 705/1, 26

(56) References Cited

U.S. PATENT DOCUMENTS 6,029,141 A * 2/2000 Bezos et al. .................. 705/27
6,177,880 B1 * 1/2001 Begum .................. 340/825.35

FOREIGN PATENT DOCUMENTS

| EP | 0789470 | 8/1997 | H04L/12/66 |
|---|---|---|---|
| JP | 8314824 | 11/1996 | G06F/13/00 |
| JP | 9154108 | 6/1997 | H04N/5/93 |
| JP | 9223095 | 8/1997 | G06F/13/00 |
| WO | 9639769 | 12/1996 | H04L/29/06 |

OTHER PUBLICATIONS

B. Lieberman, et al, "Java–Based Mobile Agents—How to Migrate, Persist, and Interact on Electronic Service Markets", First International Workshop, MA '07 Proceedings, Berlin, Germany, Apr. 7–8, 1997, pp. 27–38.

S. Mazingo, "Accessing Corporate Data from the Web", Digital Systems Report, Winter 1996, Computer Economics, vol. 18, No. 5, pp. 27–29.

D. Connolly, "IBM's Electronic Commerce Solution: CommercePOINT", IBM Systems Journal, 1997, vol. 36, No. 1, pp. 162–166.

A. Iyengar, "Dynamic Argument Embedding: Preserving State on the World Wide Web", IEEE Internet Computing, Mar.–Apr. 1997, vol. 1, No. 2, pp. 50–56.

* cited by examiner

Primary Examiner—David Y. Eng
(74) Attorney, Agent, or Firm—Jeanine S. Ray-Yarletts

(57) ABSTRACT

Extended business transactions are processed in a client-server system in a manner which allows processing initiated by a client to be interrupted before the transaction is complete and later resumed by the same or another client from the point of interruption. This is achieved by storing state information indicative of the progress of the transaction in a repository in association with an end-user identifier. When the end-user communicates his identifier via a client to the server for a second time, processing of the transaction can be resumed on the basis of the stored state.

26 Claims, 4 Drawing Sheets

| USER ID 1 | AIT 1 | Req ID 1 | Data 1 | Display Name 1 |
|---|---|---|---|---|
| USER ID 2 | AIT 2 | Req ID 2 | Data 2 | Display Name 2 |
| USER ID 2 | AIT 3 | Req ID 3 | — | Display Name 3 |
| ○ | ○ | ○ | ○ | ○ |
| ○ | ○ | ○ | ○ | ○ |
| ○ | ○ | ○ | ○ | ○ |
| ○ | ○ | ○ | ○ | ○ |
| ○ | ○ | ○ | ○ | ○ |

PROCESSING EXTENDED TRANSACTIONS IN A CLIENT-SERVER SYSTEM

TECHNICAL FIELD OF THE INVENTION

The present invention relates to the processing of extended transactions in a client-server environment.

BACKGROUND OF THE INVENTION

A business transaction is a self-contained business deal, for example, buying a theatre ticket. Some business transactions are simple and short-lived. However, many are not, involving multiple actions that take place over an extended period, such as selling a holiday or a house. Such transactions will be referred to as "extended transactions".

Traditional transaction processing systems based on large databases and telecommunications networks are very well established. Such systems enable end-users to initiate and complete short business transactions via a terminal network with, for example, a bank, to make payments into or out of a bank account or simply to make an enquiry as to the balance. Such transactions are usually relatively short lived (of the order of minutes) and either complete or fail within that time span. A communication session is established for the duration of the transaction and, when it is finished, communication is terminated. There is no concept of suspending the transaction indefinitely and resuming at a later time or date although, while a transaction is active, necessary state information is maintained to enable progression of the transaction and to permit recovery in the event of failure.

Traditional transaction processing systems have been implemented not only as mainframe data processor complexes with a network of linked terminals, acting as input-output devices with no intelligence, but also as client-server (distributed) systems in which a limited amount of the data processing may be done at a local client computer, which calls further large programs in a server computer to complete the processing action. The client often handles input and output of data to the server and includes the terminal which the end-user actually uses. It may handle aspects of data conversion and translation between interfaces which a simple terminal could not handle.

More recently, the Internet has allowed a massive amount of information to be accessed by individual computer users connected by so-called web browsers to web servers maintained by information service providers. These web browsers are general purpose client computers designed in accordance with established protocols, such as HTTP, to transfer information in the format known as HTML. However, the HTTP protocol is stateless so that a web browser's communications with the web server terminate after each HTML transfer and the server does not preserve knowledge of the previous connection. This does not lend itself, therefore, to transaction processing.

Nevertheless, various ways of maintaining or retrieving some state information about the current progress of a transaction have been implemented in order to allow transaction processing to be performed over the Internet. State information may be hidden in HTML forms and passed back and forth between client and server so that the server can associate the new input from the client with a transaction whose state it has saved. Another known system, provided by Netscape Communications Corp. in connection with their Netscape Navigator browser system ("Netscape" is a trademark of Netscape Communications, Inc.) involves the use of what are known as "cookies", which allow some state information to be preserved by appending cookies to server responses. Another method, described in our publication pending European patent application no. 0812088 involves embedding state information in "continuations" (hyperlinks) returned by the server to a client.

However, these known ways of introducing state information only allow the processing of a transaction to continue where the client retains this information from the server and is able to pass it back to resume the transaction. It does not allow for the complete disconnection of a client and loss of the relevant state information such as might occur in a long-running business transaction. Nor does it allow for resumption of the interrupted transaction from another client.

DISCLOSURE OF THE INVENTION

A method of processing several types of extended transaction for an end-user in a client-server data processing system including a server and a plurality of clients, extended transactions being transactions made up of component transactional interactions with an end-user towards a common goal the processing of which can be suspended for an indefinite period and resumed at a later time, each client being capable of establishing communication with said server for processing said end-user transactional interactions; the method comprising the steps in the server of: initially receiving an end-user identifier from one of said clients; presenting a menu of said several types of extended transaction to said client for selection; receiving a selection of an extended transaction from said client; commencing processing of said selected extended transaction; storing state information indicative of the progress of said selected transaction; associating said end-user identifier with said state information for said selected transaction; ceasing processing of said selected transaction following cessation of communication with said one client; following cessation of processing of said transaction, receiving said end-user identifier for a second time from another of said clients; in response to receipt of said identifier for a second time, presenting all current extended transactions for that end-user to said other client for a second selection by said client of one of said extended transactions; and in response to said second selection, resuming processing of said transaction from a point determined by said stored state information for the selected transaction.

According to a second aspect, the invention also provides a computer program for performing the above method according to the invention.

According to a third aspect, the invention also provides a server for processing several types of extended transaction for an end-user in a client-server data processing system including a plurality of clients, extended transactions being transactions made up of component transactional interactions with an end-user towards a common goal the processing of which can be suspended for an indefinite period and resumed at a later time, each client being capable of establishing communication with said server for processing said end-user transactional interactions; the server comprising: transaction processing means; and means for connecting clients to the transaction processing means to enable communication therebetween; the transaction processing means being responsive to a first communication from one of said clients of an end-user identifier to present a menu of said several types of extended transaction to said client for selection, and in response to selection by said client of an extended transaction to start processing the selected extended transaction and to generate state information indicative of the progress of the selected extended transaction; the server further comprising a repository for storing said transaction state information in association with said end-user identifier; the transaction processing means being responsive, following cessation of communication with said one client to cease processing the selected transaction, and being responsive to receipt of said end user identifier for a second time from another of said clients to present all current extended transactions for that end-user to said other client for a second selection by said other client of one of said extended transactions; and in response to said second selection, resuming processing of said transaction from a point determined by said stored state information for the selected transaction in said repository.

Thus, by using the end-user identifier, such as a name or password, previously started transactions of that end-user can be identified and processing resumed from a point indicated by the stored state information in the repository. The stored state information may correspond to the state at the time communication between client and server ceased or to a later state reached as a result of the transaction processing means continuing to process the transaction asynchronously until such time as further client input is required.

A major advantage of the invention is that it permits extended transactions to be resumed from a different client from the client which initiated the transaction. This corresponds to the real world in which an end-user may be in a physically different location with different equipment when wanting to resume the transaction.

The invention also allows end-users to work on multiple transactions. In response to a client communicating the end-user identifier, the server presents all current transactions for that end-user to the client which identifies an end-user selected transaction to the server for processing.

Preferably, the association of stored state information with an end-user is achieved by the generation of a token for the selected extended transaction and then providing the token following the second selection by the other client to enable resumption of processing of that transaction from its stored state.

Additionally, as the extended transaction involves multiple interactions between server and client and the client has no ability to store state information, it is a preferred feature of the invention that a token is generated, uniquely identifying the transaction and also being identified with its state information. This token is passed back from server to client with a response requiring end-user interaction and then passed back to the server with the end-user response so that processing of the transaction is resumed from its current state, as defined by the respective state information.

In a further preferred embodiment, not only does the invention allow resumption of processing from another client but it also allows that client to be of a different type. To achieve this, the server provides information for sending to the client in client-neutral form and this is later converted to client specific form for presentation to the end-user by the new type of client.

The client neutral information can include both business data and a generic display format name. In this case, the invention provides for mapping the generic display format name into a client specific template for displaying said business data.

BRIEF DESCRIPTION OF THE DRAWINGS

The present invention will now be described, by way of example only, with reference to a preferred embodiment thereof, as illustrated in the accompanying drawings, in which:

FIG. 3 illustrates the contents of a homebase repository forming part of the system of FIG. 1.

DETAILED DESCRIPTION OF A PREFERRED EMBODIMENT OF THE INVENTION

Figure 1:
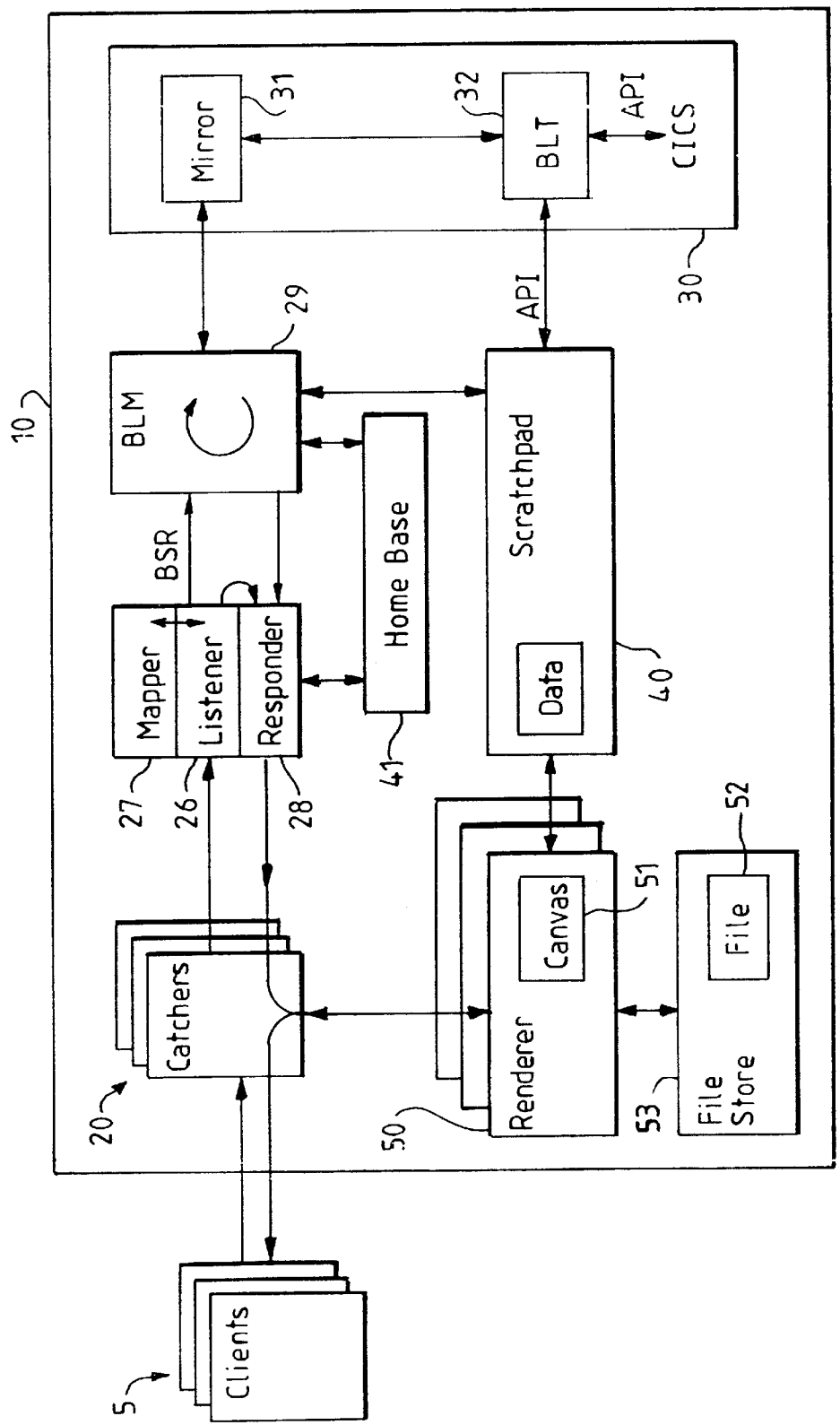
FIG. 1 is an block diagram of a server system for processing extended transactions in accordance with the present invention.

In FIG. 1 is shown a client-server system in which multiple clients 5 communicate with an extended transaction managing server system 10 to execute business transactions, initiated by an end user through one of the clients.

As will be discussed in more detail in relation to FIG. 2, the clients may be of various different types, including conventional web browsers, IBM 3270 terminals ("IBM" is a trademark of International Business Machines Corporation) and voice responsive devices.

A typical extended business transaction could be to obtain insurance by requesting quotations, selecting the best one, receiving an acceptance and invoice and making the final payment. The various stages of such a transaction could take place at different times and places and it may be most convenient for the customer to use different clients to perform the different stages of the transaction. For example, the customer may originally request a quote from his web browser but subsequently ring an automated call centre to take up a particular quotation. Payment may be from another type of client again.

To support this application model, not only must the extended transaction manager be able to cope with input from different types of client but it must also provide a mechanism by which the customer can hook back into the same transaction regardless of which client he is using. The system of FIG. 1 provides these facilities.

In the system of FIG. 1, every input from a client 5 to the extended transaction managing server 10 is treated as a request either for a business service or simply for delivery of a static page back to the client to provide information to the user or to enable him to provide further input.

These requests are initially routed to one of a number of catchers 20, each of which corresponds to a particular type of client. The catchers 20 together with a listener 26, mapper 27 and responder 28 form the work initiation portion of the server 10. The listener, mapper and responder form a common client-neutral section having no knowledge of the type of client and perform a standard set of steps regardless of the type of client originating the work. The catchers 20 and associated renderers 50, however, are unique to particular types of clients. By splitting the work initiation portion in this way, the server design is made sufficiently flexible to permit the addition of further types of client without a total redesign.

The basic function of the catchers 20, on receiving an input from a client, is to extract the generic request name and any additional data from the client input and to pass this to a queue in the listener 26. If the client has also provided an Application Interaction Token (AIT), one of which is associated uniquely with every extended transaction, this is also passed to the listener.

In the case of a web browser client, the client input is sent via a web server (not shown for the generalised clients 5 of FIG. 1) which recognises a URL (Uniform Resource Locator) in the browser input as a request name and passes the data over a Common Gateway interface (CGI) to one of the catchers 20 which is specific to a web browser client. The catcher converts the web based data, such as the URL, to a generic form of request and data and passes it to the listener 26.

The listener 26 processes its queue to route work requests to the appropriate server process. It does this by passing the generic request name, any associated data and the AIT, if any, to the mapper 27. The mapper looks up the request name and returns a 'type' to the listener indicating whether this is a business service request (BSR) or a request for page delivery to provide a response to the client. If an AIT is supplied with the request, the mapper validates it. If no AIT is supplied and the request name is recognised as the first of a new extended transaction, the mapper generates an AIT.

In accordance with the type returned by the mapper, the listener either passes a BSR to a business logic manager (BLM) 29 or passes a page delivery request in the form of a canvas ID to a queue in responder 28. Each item on a responder queue represents a reply to a request. A canvas ID or name identifies a generic type of canvas (or template) suitable for presentation of information back to clients in response to the particular request.

The responder 28 routes responses (in this case the canvas ID) to the appropriate catcher 20. This catcher passes the canvas ID to a respective client-specific renderer 50 which generates an actual canvas 51 by combining a client-specific file 52, stored in a file store 53, with externally supplied data, if any. The canvas is returned to the appropriate catcher 20 and passed on to the specific client which displays it to the user.

Initially, when a user wishes to initiate a new business transaction, he identifies himself to the server via the appropriate client by supplying his name (ID) and optionally a password. As described above, the work initiation portion of the server returns a canvas presenting a menu of possible extended transactions to the user. The user then selects one of the transactions and this selection is converted by the work initiation portion of the server first to a generic request name and then to a business service request to a business logic manager (BLM) 29.

The business logic manager 29 determines what action to take according to predefined rules for processing this type of extended transaction. It divides the BSR into a set of component business logic tasks (BLTs) which it then schedules to be carried out by a back-end transaction processing system 30, coordinating the tasks and the handling of their responses according to criteria defined by the rules. The system 30 may be a conventional transaction processing system, such as the CICS system from IBM ("CICS" is a trademark of International Business Machines Corporation), to which has been added a mirror function 31 for scheduling the tasks. The BLTs, such as BLT 32, run as applications in the CICS system and can call CICS functions over the CICS API.

The BLTs may obtain information from CICS resources and put the data into an application scratchpad 40, over a special API for the extended transaction manager. This information may include state data for the transaction, generated as it progresses through various stages.

For the first valid new request of an extended transaction, an application interaction service in the mapper generates the application interaction token (AIT) which is unique to this instance of the particular extended transaction and stores it, along with the generic request name and, optionally, user supplied data in a home base repository 41. The AIT can be used as a key to access the further state information in the scratchpad, if necessary.

When the BLT has finished, it returns control to the BLM 29. The BLM looks at the response from the BLT and returns it to the responder 28 in client-neutral form. The responder passes the generic response, including the name of a canvas, to the catcher 20 from which the request originated. As described above for page delivery, the catcher passes the canvas name to the respective renderer 50, which accesses a file 52 in a file store 53, to generate a client specific canvas for return to the catcher 20. In the case of a web browser, the file may be an HTML page.

If the particular response to the client and end-user needs data from the BLT, this is obtained by the appropriate renderer 50 from the scratchpad 40 and also included in the file which is returned to the catcher. The business data is client-neutral, consisting only of data-name value pairs. Finally, the catcher returns the response to the client 5, which initiated the transaction.

As indicated above, the catcher/renderer listener/responder arrangement is designed to separate the business logic and the presentation (client) logic so that the business logic has no need to know the type of client with which it is communicating. This ensures that if the client-type changes during the life of the interaction, the business logic is in no way affected.

The table constituting the home base 41 is shown in FIG. 3 and gives the facility for switching clients within the course of an extended transaction by providing a repository for the current state of any extended transaction belonging to an identified user. Thus, as can be seen in FIG. 3, each row of the home base consists of a unique token (AIT) for each extended transaction in the second column. Each AIT is associated with a particular user, whose user ID is in the first column. Other columns contain the generic request ID and, optionally, data which may have been provided by the end user or by a previous BLT and also a displayable extended transaction name. For some stages of the extended transaction, the data field may be blank because no user data was required or returned. A user may also have more than one current transaction, as is shown for user ID 2 in the third row of the table. The request ID and data will change during the progress of the extended transaction to represent the current state of the transaction. In the insurance example, they could initially represent an insurance quotation but could later be updated to represent the selection and payment stages of the transaction. The request ID will normally change in response to a further input from the client but may, in some cases, be changed by the BLM.

For some extended transactions, where the state information is more complex, it may be stored in the scratchpad 40 and accessed by using the AIT as a key.

Figure 2:
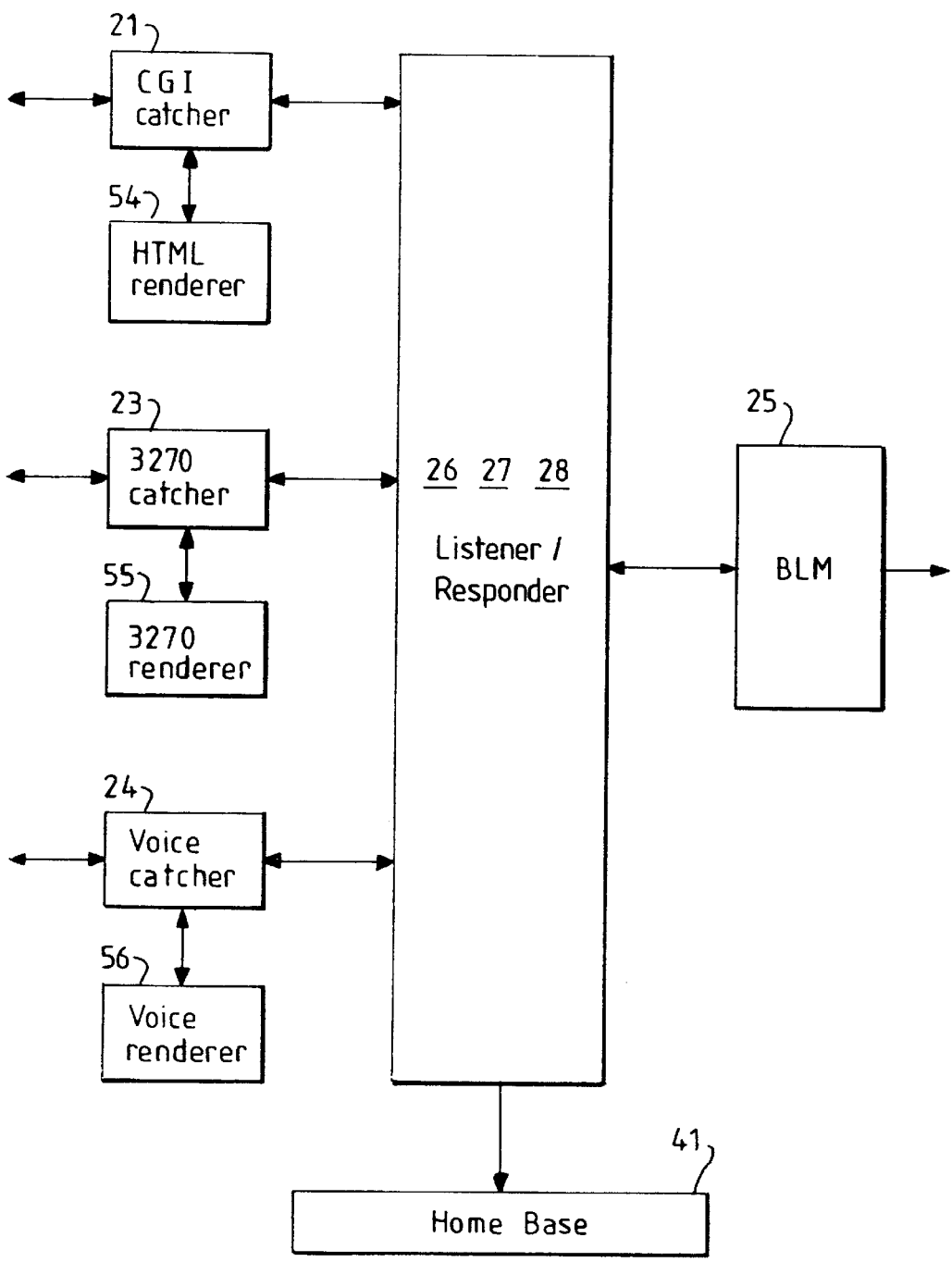
FIG. 2 shows one example of the system of FIG. 1 adapted for three specific types of client.

In the example of FIG. 2, a customer looking for a holiday package may register with a travel agent's extended transaction manager system from a home computer, connected as a web browser to the Internet. This communication is routed by a web server (not shown) over a common gateway interface to a CGI catcher 21 in the travel agent's system. The customer is presented with information to enable her to make enquiries on various combinations of travel destinations, dates and hotels. The information is converted for presentation to the customer's browser by HTML renderer 54. On completing this initial enquiry, the customer disconnects but the state of the transaction is stored in or by way of the homebase.

In her lunch hour, the customer may visit the travel agent's office to discuss the results of her enquiry and provisionally book one of the offers. This is done from the travel agent's IBM 3270 terminal, which is permanently on-line to the system and connected to 3270 catcher 23. Feedback from the system is converted to 3270 format by renderer 55. The transaction is resumed from the previous state in response to provision of the customer's ID and presentation of her in-flight transactions. Confirmation is not immediately available so the customer terminates the connection to suspend the transaction.

In the evening, she phones an automated voice-response service at the travel agent's, identifies herself and is able to get confirmation of her booking via voice catcher 24 and renderer 56.

In this scenario, the same customer interacts with the agent's system via three different clients to initiate and progress her business transaction. Note, however, that any of her accesses could have been performed from any of the clients in any order or from a single client. The invention allows continuation of the transaction from any client after lengthy periods of disconnection from the system between interactions.

Figure 4:
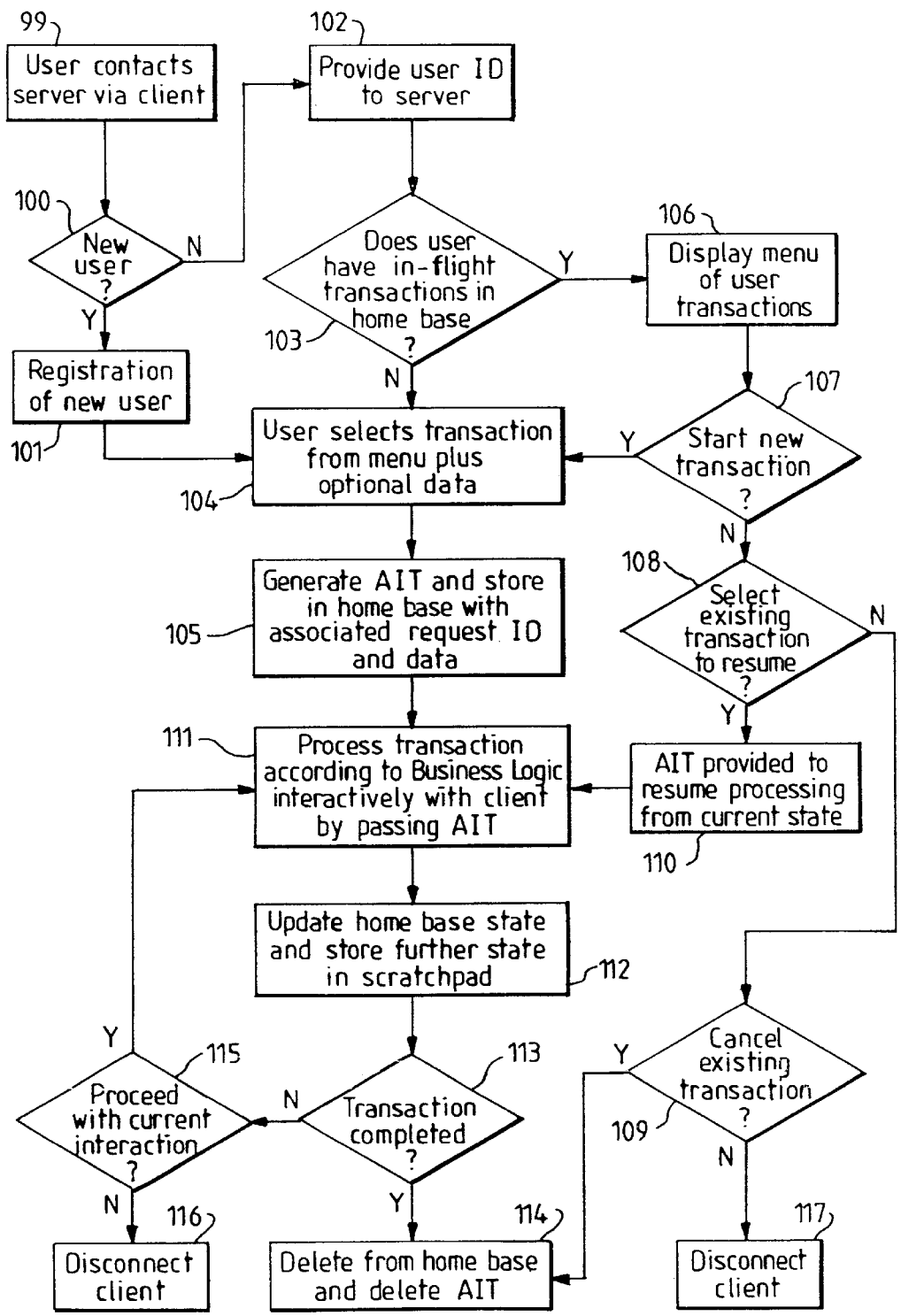
FIG. 4 is a flow diagram illustrating a method of processing extended transactions according to the invention.

The operation of the system will now be described in more detail with reference to the flow diagram of FIG. 4.

When a user accesses the server through any client, in step 99, he will be given the opportunity (step 100) to register (step 101), if a new user. A user who is already registered identifies himself, in step 102, by supplying a name and password, customer number or similar identification.

In step 103, the home base is checked, to see if the known user has any "in-flight" extended transactions, that is, existing but incomplete transactions which are currently suspended. If not, in step 104, a menu of available business transactions is presented to the user. The same menu is also presented to a newly registered user. The user selects one of these transactions and fills in any data fields which are then required and the corresponding opening request ID and data are sent to the appropriate catcher. After the request ID and data are converted to generic form and passed to the listener and mapper, the unique AIT for the newly started transaction is then generated by the mapper and stored in the home base, together with the associated request ID and any data (step 105).

If the user did have in-flight transactions, the system would instead, in step 106, display a menu of these transactions and give the user the option of starting a new transaction (step 107), resuming an existing transaction (step 108) or cancelling an existing transaction (step 109). Selecting the option of starting a new transaction, leads the user through steps 104 and 105 as described above.

In step 111, after generation of the AIT and of a home base entry in step 105, the initial request is passed, via the listener and mapper, as a business service request to the business logic manager 29 and the business logic tasks 32 are started. These normally involve further interaction with the user via the client. The AIT is passed to the client from the server via the responder and catcher so that the client can continue the interaction from the current point in the transaction without having to retain any information itself as to the current state of the transaction. The AIT is resent by the client to the catcher in the next response which forms part of the same interaction.

If, in step 108, the user selects an existing transaction to resume, the homebase entries for that user are scanned, in step 110, and the AIT for the selected existing transaction is provided. Processing then resumes, in step 111, from the state stored in the homebase 41 and/or scratchpad 40.

Whenever the business logic reaches a significant point in the processing of an extended transaction, for example, upon receipt of a new request from the client, it makes a call (step 112) to the home base to update the record for that transaction with the appropriate request ID and data and, if required, stores additional state data in the scratchpad. The stored information is always that appropriate for resuming the transaction. Thus, when the user next accesses the system through any client, provision of the AIT in step 110 enables the transaction processing to be resumed from the stored state.

This allows the user to terminate further processing of the extended transaction from a particular client at any time and to resume from the same point at a later time from either the original client or from a completely different client. Irrespective of the clients, abilities to do so, state information about the transaction cannot be stored at the client because the new access may be from a client which has not previously been associated with that transaction. In addition, a single user may have more than one ongoing transaction in the same system and may want to be able to continue with any of them.

When an extended transaction is completed (step 113) or a decision is made to cancel an existing transaction (step 109), the record of the transaction is deleted from the home base, together with its AIT (step 114). If the transaction is not completed, the client either proceeds with further processing from step 115 by returning to step 111 or terminates its interaction by disconnecting at step 116 to interrupt the transaction at an intermediate state. Disconnection also takes place, in step 117, if, in step 109, the user decides not to cancel the existing transaction. Processing can be resumed from step 100 at a later time by the user providing his user id via any client.

What is claimed is:

1. A method of processing several types of extended transaction for an end-user in a client-server data processing system including a server and a plurality of clients, extended transactions being transactions made up of component transactional interactions with an end-user towards a common goal the processing of which can be suspended for an indefinite period and resumed at a later time, each client being capable of establishing communication with said server for processing said end-user transactional interactions;

the method comprising the steps in the server of:
  initially receiving an end-user identifier from one of said clients;
  presenting a menu of said several types of extended transaction to said client for selection;
  receiving a selection of an extended transaction from said client;
  commencing processing of said selected extended transaction;
  storing state information indicative of the progress of said selected transaction;
  associating said end-user identifier with said state information for said selected transaction;
  ceasing processing of said selected transaction following cessation of communication with said one client;
  following cessation of processing of said transaction, receiving said end-user identifier for a second time from another of said clients;
  in response to receipt of said identifier for a second time, presenting all current extended transactions for that end-user to said other client for a second selection by said client of one of said extended transactions; and in response to said second selection, resuming processing of said transaction from a point determined by said stored state information for the selected transaction.

2. A method as claimed in claim 1 wherein the associating step includes generating a token for the selected extended transaction uniquely identifying that transaction and also being associated with its state information, the method further including the step of, following said second selection by said other client, providing the token for the selected extended transaction to enable said resumption of processing of that transaction from its stored state.

3. A method as claimed in claim 2, including the further steps of, during an end-user transactional interaction, passing said token back to a client with a response requiring end-user interaction, and receiving said end-user interactive response back from said client to said server with said token so that processing of that end-user transactional interaction is resumed from its current state.

4. A method as claimed in claim 1 in which the client-server system includes first and second clients of different types, the method including the steps of the server providing information for sending to the client in client-neutral form and converting said client-neutral information to the appropriate client specific form for presentation to said end-user by said respective client.

5. A server for processing several types of extended transaction for an end-user in a client-server data processing system including a plurality of clients, extended transactions being transactions made up of component transactional interactions with an end-user towards a common goal the processing of which can be suspended for an indefinite period and resumed at a later time, each client being capable of establishing communication with said server for processing said end-user transactional interactions;

the server comprising:
transaction processing means; and
means for connecting clients to the transaction processing means to enable communication therebetween;
the transaction processing means being responsive to a first communication from one of said clients of an end-user identifier to present a menu of said several types of extended transaction to said client for selection, and in response to selection by said client of an extended transaction to start processing the selected extended transaction and to generate state information indicative of the progress of the selected extended transaction;
the server further comprising a repository for storing said transaction state information in association with said end-user identifier;
the transaction processing means being responsive, following cessation of communication with said one client to cease processing the selected transaction, and being responsive to receipt of said end user identifier for a second time from another of said clients to present all current extended transactions for that end-user to said other client for a second selection by said other client of one of said extended transactions; and in response to said second selection, resuming processing of said transaction from a point determined by said stored state information for the selected transaction in said repository.

6. A server as claimed in claim 5 for use in a system wherein the clients have no ability to store state information;
the server further including:
means for generating a token uniquely identifying a selected extended transaction and for storing said token in the repository in association with the transaction state information; and
means for providing the token for the selected extended transaction following said second selection, to enable said resumption of processing of that transaction from its stored state by the transaction processing means.

7. A server as claimed in claim 6 including means for passing the token back from said server to the client, during an end-user transactional interaction, with a response requiring end-user interaction, and means for receiving an end-user interactive response back from said client including said token so that processing of that end-user transactional interaction is resumed from its current state.

8. A server as claimed in claim 5 in which the server includes means for communicating output from said transaction processing means to a client as information in client neutral form, and output conversion means for converting said client neutral information to the appropriate client specific form for presentation to said end-user by said respective client, whereby clients of different types may be accommodated.

9. A server as claimed in claim 8 in which said communicated client neutral information includes both business data and a generic display format name, said output conversion means including a rendering means to map said generic display format name into a client specific template for displaying said business data.

10. A server as claimed in claim 8 further including input conversion means for converting information in client specific form to information in client neutral form; and
work initiation means responsive to client neutral information to map such information into requests for presentation of pre-stored information to said client and requests for transaction processing by said transaction processing means.

11. A server as claimed in claim 10 in which the transaction processing means includes a business logic manager for breaking up a request for transaction processing into a number of tasks and for scheduling these tasks for processing, and a task processing means for processing individual tasks.

12. A server as claimed in claim 8 for use with at least one web browser client, the client specific form for presentation to said end-user by the at least one web browser client being HTML pages.

13. A server as claimed in claim 12, for use also with at least one dumb terminal client and one voice responsive client, said output conversion means being capable of converting said client neutral information into output specific to a dumb terminal or voice response unit as appropriate.

14. A computer program product recorded on a medium, for performing a method of processing several types of extended transaction for an end-user in a client-server data processing system including a server and a plurality of clients, extended transactions being transactions made up of component transactional interactions with an end-user towards a common goal, the processing of which can be suspended for an indefinite period and resumed at a later time, each client being capable of establishing communication with said server for processing said end-user transactional interactions;

the method comprising the steps in the server of:
  initially receiving an end-user identifier from one of said clients;
  presenting a menu of said several types of extended transaction to said client for selection;
  receiving a selection of an extended transaction from said client;
  commencing processing of said selected extended transaction;
  storing state information indicative of the progress of said selected transaction;
  associating said end-user identifier with said state information for said selected transaction;
  ceasing processing of said selected transaction following cessation of communication with said one client;
  following cessation of processing of said transaction, receiving said end-user identifier for a second time from another of said clients;
  in response to receipt of said identifier for a second time, presenting all current extended transactions for that end-user to said other client for a second selection (107, 108) by said other client of one of said extended transactions; and
  in response to said second selection, resuming processing of said transaction from a point determined by said stored state information for the selected transaction.

15. A method of processing several types of extended transaction for an end-user in a client-server data processing system including a server and a plurality of clients including first and second clients of different types, extended transactions being transactions made up of component transactional interactions with an end-user towards a common goal the processing of which can be suspended for an indefinite period and resumed at a later time, each client being capable of establishing communication with said server for processing said end-user transactional interactions;
  the method comprising the steps in the server of:
    initially receiving an end-user identifier from said first client;
    presenting a menu of said several types of extended transaction to said client for selection;
    receiving a selection of an extended transaction from said first client;
    commencing processing of said selected extended transaction;
    storing state information indicative of the progress of said selected transaction;
    associating said end-user identifier with said state information for said selected transaction;
    ceasing processing of said selected transaction following cessation of communication with said first client;
    following cessation of processing of said transaction, receiving said end-user identifier for a second time from said second client;
    in response to receipt of said identifier for a second time, presenting all current extended transactions for that end-user to said second client for a second selection by said second client of one of said extended transactions; and
    in response to said second selection, resuming processing of said transaction from a point determined by said stored state information for the selected transaction; wherein the server provides information for sending to any of said clients in client-neutral form and converts said client-neutral information to the appropriate client specific form for presentation to said end-user by said respective client.

16. A method as claimed in claim 15 wherein the associating step includes generating a token for the selected extended transaction uniquely identifying that transaction and also being associated with its state information, the method further including the step of, following said second selection by said other client, providing the token for the selected extended transaction to enable said resumption of processing of that transaction from its stored state.

17. A method as claimed in claim 16, including the further steps of, during an end-user transactional interaction, passing said token back to a client with a response requiring end-user interaction, and receiving said end-user interactive response back from said client to said server with said token so that processing of that end-user transactional interaction is resumed from its current state.

18. A server for processing several types of extended transaction for an end-user in a client-server data processing system including first and second clients of different types, extended transactions being transactions made up of component transactional interactions with an end-user towards a common goal the processing of which can be suspended for an indefinite period and resumed at a later time, each client being capable of establishing communication with said server for processing said end-user transactional interactions;
  the server comprising:
    transaction processing means; and
    means for connecting said clients to the transaction processing means to enable communication therebetween;
    the transaction processing means being responsive to a first communication from said first client of an end-user identifier to present a menu of said several types of extended transaction to said first client for selection, and in response to selection by said first client of an extended transaction to start processing the selected extended transaction and to generate state information indicative of the progress of the selected extended transaction;
    the server further comprising a repository for storing said transaction state information in association with said end-user identifier;
    the transaction processing means being responsive, following cessation of communication with said first client to cease processing the selected transaction, and being responsive to receipt of said end user identifier for a second time from said second client to present all current extended transactions for that end-user to said second client for a second selection by said second client of one of said extended transaction, and,
    in response to said second selection, resuming processing of said transaction from a point determined by said stored state information for the selected transaction in said repository; said server further including means for communicating output from said transaction processing means to either client as information in client neutral form, and output conversion means for converting said client neutral information to the appropriate client specific form for presentation to said end-user by said respective client, whereby clients of different types may be accommodated.

19. A server as claimed in claim 18 for use in a system wherein the clients have no ability to store state information;
  the server further including:
    means for generating a token uniquely identifying a selected extended transaction and for storing said token in the repository in association with the transaction state information; and means for providing the token for the selected extended transaction following said second selection, to enable said resumption of processing of that transaction from its stored state by the transaction processing means.

20. A server as claimed in claim 19 including means for passing the token back from said server to the client, during an end-user transactional interaction, with a response requiring end-user interaction, and means for receiving an end-user interactive response back from said client including said token so that processing of that end-user transactional interaction is resumed from its current state.

21. A server as claimed in claim 18 in which said communicated client neutral information includes both business data and a generic display format name, said output conversion means including a rendering means to map said generic display format name into a client specific template for displaying said business data.

22. A server as claimed in claim 18 further including input conversion means for converting information in client specific form to information in client neutral form; and work initiation means responsive to client neutral information to map such information into requests for presentation of pre-stored information to said client and requests for transaction processing by said transaction processing means.

23. A server as claimed in claim 22 in which the transaction processing means includes a business logic manager for breaking up a request for transaction processing into a number of tasks and for scheduling these tasks for processing, and a task processing means for processing individual tasks.

24. A server as claimed in claim 18 for use with at least one web browser client, the client specific form for presentation to said end-user by the at least one web browser client being HTML pages.

25. A server as claimed in claim 24, for use also with at least one dumb terminal client and one voice responsive client, said output conversion means being capable of converting said client neutral information into output specific to a dumb terminal or voice response unit as appropriate.

26. A computer program product recorded on a medium, for performing a method of processing several types of extended transaction for an end-user in a client-server data processing system including a server and a plurality of clients including first and second clients of different types, extended transactions being transactions made up of component transactional interactions with an end-user towards a common goal, the processing of which can be suspended for an indefinite period and resumed at a later time, each client being capable of establishing communication with said server for processing said end-user transactional interactions;

the method comprising the steps in the server of:
initially receiving an end-user identifier from said first client;
presenting a menu of said several types of extended transaction to said first client for selection;
receiving a selection of an extended transaction from said first client;
commencing processing of said selected extended transaction;
storing state information indicative of the progress of said selected transaction;
associating said end-user identifier with said state information for said selected transaction;
ceasing processing of said selected transaction following cessation of communication with said first client;
following cessation of processing of said transaction, receiving said end-user identifier for a second time from said second client;
in response to receipt of said identifier for a second time, presenting all current extended transactions for that end-user to said second client for a second selection by said second client of one of said extended transactions; and
in response to said second selection, resuming processing of said transaction from a point determined by said stored state information for the selected transaction; wherein the server provides information for sending to any of said clients in client-neutral form and converts said client-neutral information to the appropriate client specific form for presentation to said end-user by said respective client.

* * * * *